(12) United States Patent
Ponnada et al.

(10) Patent No.: US 11,520,801 B2
(45) Date of Patent: Dec. 6, 2022

(54) SYSTEM AND METHOD FOR AUTOMATICALLY OBTAINING DATA LINEAGE IN REAL TIME

(71) Applicant: BANK OF AMERICA CORPORATION, Charlotte, NC (US)

(72) Inventors: Padmanabham Ponnada, Charlotte, NC (US); Siva Chaitanya Thurlapati Venkata, Telengana (IN); Jeff L. Howard, Charlotte, NC (US); John Popplewell, Richardson, TX (US); Ram Sekar, South Plainfield, NJ (US); Oscar Lopez-Martinez, Naas (IE); Igor Yago, Dublin (IE); Ramamurthy Pavan Nallamothu, Guntur (IN); Sundarrajan Raman, Chennai (IN)

(73) Assignee: Bank of America Corporation, Charlotte, NC (US)

( * ) Notice: Subject to any disclaimer, the term of this patent is extended or adjusted under 35 U.S.C. 154(b) by 254 days.

(21) Appl. No.: 17/094,054

(22) Filed: Nov. 10, 2020

(65) Prior Publication Data

US 2022/0147539 A1   May 12, 2022

(51) Int. Cl.
*G06F 16/25* (2019.01)
*G06F 16/22* (2019.01)
*G06F 16/2453* (2019.01)
*G06F 16/2457* (2019.01)
*G06F 9/46* (2006.01)

(52) U.S. Cl.
CPC .............. *G06F 16/258* (2019.01); *G06F 9/46* (2013.01); *G06F 16/221* (2019.01); *G06F 16/24542* (2019.01); *G06F 16/24573* (2019.01); *G06F 16/252* (2019.01)

(58) Field of Classification Search
CPC ..... G06F 16/252; G06F 16/219; G06F 16/258
See application file for complete search history.

(56) References Cited

U.S. PATENT DOCUMENTS

| 6,343,295 B1 | 1/2002 | MacLeod et al. |
| 6,434,558 B1 | 8/2002 | MacLeod et al. |
| 7,493,570 B2 | 2/2009 | Bobbin et al. |
| 8,819,010 B2 | 8/2014 | Fankhauser et al. |
| 9,075,860 B2 | 7/2015 | Kozina et al. |
| 9,110,967 B2 | 8/2015 | Halberstadt |
| 9,171,283 B2 | 10/2015 | Curbera et al. |

(Continued)

*Primary Examiner* — James Trujillo
*Assistant Examiner* — J Mitchell Curran (57) ABSTRACT

A system includes an execution engine and a processor. The execution engine receives application code that, when executed, is configured to generate a second data element from a first data element that is stored in a first database and store the second element in a second database. The execution engine converts the code into an execution plan and executes it. The execution plan includes a first operation to obtain the first element from the first database, a second operation to apply a transformation to the first element, and a third operation to store the first element as the second element in the second database. The processor accesses the execution plan and determines that the third operation includes storing the second element. In response, the processor generates a data lineage for the second element by extracting, from each operation from the third to the first, a portion of the data lineage.

20 Claims, 3 Drawing Sheets

(56) References Cited

U.S. PATENT DOCUMENTS

| | | |
|---|---|---|
| 9,348,879 B2 | 5/2016 | Mohammad et al. |
| 9,384,231 B2 | 7/2016 | Benjamin et al. |
| 9,514,203 B2 | 12/2016 | Mohammad et al. |
| 9,659,042 B2 | 5/2017 | Puri et al. |
| 10,025,878 B1 | 7/2018 | Lefever et al. |
| 10,089,335 B2 | 10/2018 | Liensberger et al. |
| 10,313,177 B2 | 6/2019 | Radivojevic et al. |
| 10,445,170 B1 | 10/2019 | Subramanian et al. |
| 10,459,954 B1 | 10/2019 | Walters et al. |
| 10,481,961 B1 | 11/2019 | Chapin |
| 10,503,905 B1 | 12/2019 | Misra et al. |
| 10,521,459 B2 | 12/2019 | Radivojevic |
| 10,602,202 B1 | 3/2020 | Taylor et al. |
| 10,637,669 B2 | 4/2020 | Johnson et al. |
| 10,705,877 B2 | 7/2020 | Wolfson et al. |
| 2012/0310875 A1 | 12/2012 | Prahlad et al. |
| 2015/0347193 A1 | 12/2015 | Wolfson et al. |
| 2016/0196187 A1 | 7/2016 | Thakur et al. |
| 2016/0232230 A1 | 8/2016 | Radivojevic |
| 2017/0270022 A1 | 9/2017 | Moresmau et al. |
| 2017/0351991 A1 | 12/2017 | Halberstadt et al. |
| 2018/0004781 A1 | 1/2018 | Mukherjee et al. |
| 2018/0089277 A1 | 3/2018 | Vankamamidi et al. |
| 2018/0181630 A1 | 6/2018 | He et al. |
| 2018/0341658 A1 | 11/2018 | Aggarwal et al. |
| 2019/0188308 A1* | 6/2019 | Simon .................. G06F 16/256 |
| 2019/0220458 A1 | 7/2019 | Chapin |
| 2019/0392638 A1 | 12/2019 | Gordon et al. |
| 2020/0050598 A1 | 2/2020 | Gould et al. |
| 2021/0117437 A1* | 4/2021 | Gibson ................ G06F 16/258 |

\* cited by examiner

SYSTEM AND METHOD FOR AUTOMATICALLY OBTAINING DATA LINEAGE IN REAL TIME

TECHNICAL FIELD

The present disclosure relates generally to information storage and retrieval, and more particularly, to a system and method for automatically obtaining data lineage in real time.

BACKGROUND

Data lineage tracks the lifecycle of a data element from its origin to its destination, including various transformations performed on the data element.

SUMMARY

The ability to accurately track the lifecycle of data within an organization is important for a variety of reasons. For example, data lineage may be used to (1) provide insights into the complexity of business applications and/or data flows within an organization, (2) aid in error detection and recovery, (3) help in performing an analysis of the dependencies of data to changes in applications, (4) help to identify performance bottlenecks in applications, and (5) support auditing and regulatory compliance analysis. The data lineage of a data element depends on the transformations performed on the data element by applications used by the organization. Such transformations may be performed within a single application or across multiple applications.

Existing solutions for extracting data lineage based on an organization's software applications typically rely on scanning/parsing the software programs and analyzing the dependencies between the various programs using a network graph, in order to identify the transformations that the applications may perform on various data elements. However, these existing solutions suffer from several drawbacks. First, because these solutions rely on parsing software code at rest (in contrast to during execution) the data lineage generated by the solutions may not be complete. This may occur because not all of the values for the parameters/variables used in the software codes are known prior to runtime (e.g., the parameters/variables are dynamically assigned values at runtime), and/or because the software may rely on data extraction code that is not known prior to runtime (e.g., the data extraction code is dynamically generated at runtime, prior to its use). Second, because these solutions parse software code that may be written in a number of different programming languages, knowledge of these languages is typically needed. Third, existing solutions typically require information about the software architecture of an application (including data flows), in order to be able to generate end-to-end data lineage.

This disclosure contemplates a data lineage tool designed to work in conjunction with an execution engine to extract accurate and consistent data lineage in real time. When invoked to execute a software application, the execution engine translates the software code corresponding to the application into an execution plan that is agnostic to the programming language(s) used to write the software code. The execution plan includes a directed set of operations to be performed by the execution engine when executing the application. Because the execution plan is generated at runtime of the application, all of the variables within the software code have been instantiated, and any data extraction code that is to be dynamically generated prior to its execution has been created.

The data lineage tool is designed to access the execution plan and to traverse the operations in the execution plan from an operation associated with storing target data in a location in persistent storage back to one or more operations associated with extracting source data from persistent storage. In this manner, for a given piece of target data, the data lineage tool is able to trace the target data back to the source data that was used to generate it, and to identify the transformations that were performed on the data along the way. Thus, the data lineage tool is able to identify complete data lineage for the target data. An embodiment of a system that includes the data lineage tool is described below.

According to one embodiment, a system includes a first database, a second database, an execution engine, and a hardware processor communicatively coupled to the execution engine. The first database stores a set of data elements. The set of data elements includes a first data element. The execution engine includes one or more hardware processors. The execution engine receives a set of code corresponding to an application. The application is configured, when executed by the execution engine, to generate, based at least in part on the first data element, a second data element. The application is also configured, when executed by the execution engine, to store the second data element in the second database. The execution engine also executes the application. Executing the application includes converting the set of code into an execution plan. The execution plan includes a set of operations that includes a first operation, a second operation, and a third operation. The first operation includes obtaining the first data element from the first database. The second operation includes applying a transformation to the first data element to generate the second data element. The third operation includes storing the second data element in the second database. Executing the application also includes executing the execution plan.

The hardware processor accesses the execution plan. The processor also determines that the third operation of the execution plan includes storing the second data element in the second database. In response to determining that the third operation includes storing the second data element in the second database, the processor generates a data lineage for the second data element. The processor generates the data lineage by extracting, from each operation from the third operation of the execution plan to the first operation of the execution plan, a portion of the data lineage for the second data element. The portion of the data lineage extracted from the third operation includes a location of the second data element in the second database. The portion of the data lineage extracted from the second operation includes the transformation. The portion of the data lineage extracted from the first operation includes a location of the first data element in the first database.

Certain embodiments provide one or more technical advantages. As an example, an embodiment of the data lineage tool provides data lineage in real time for data that has been generated by an application. As another example, in contrast to data lineage tools that rely on parsing source code, an embodiment generates complete data lineage by extracting the data lineage at runtime, after all of the application variables have been instantiated and after any dynamically generated code associated with the application has been created. As another example, an embodiment of the data lineage tool conserves processing resources by generating data lineage as a by-product of the processing performed by an execution engine. As a further example, an embodiment of the data lineage tool does not need any knowledge of the programming language(s) in which an application was written, the type of the data processing performed by the application (e.g., data warehousing, graphical analysis, machine learning, etc.), and/or the software architecture of the application, in order to produce data lineage for data that is generated by the application.

The data lineage tool described in the present disclosure may particularly be integrated into a practical application of a tool that is designed to work in conjunction with an application execution engine, by leveraging the processing performed by the execution engine to gather accurate, complete, and real time data lineage for data generated by the execution engine during the execution of an application. The tool may be used in conjunction with an existing execution engine (e.g., the open-source Apache Spark execution engine), or an execution engine designed by an organization specifically for use with the tool.

Certain embodiments may include none, some, or all of the above technical advantages. One or more other technical advantages may be readily apparent to one skilled in the art form the figures, descriptions, and claims included herein.

BRIEF DESCRIPTION OF THE DRAWINGS

For a more complete understanding of the present disclosure, reference is now made to the following description, taken in conjunction with the accompanying drawings, in which.

DETAILED DESCRIPTION

Figure 1:
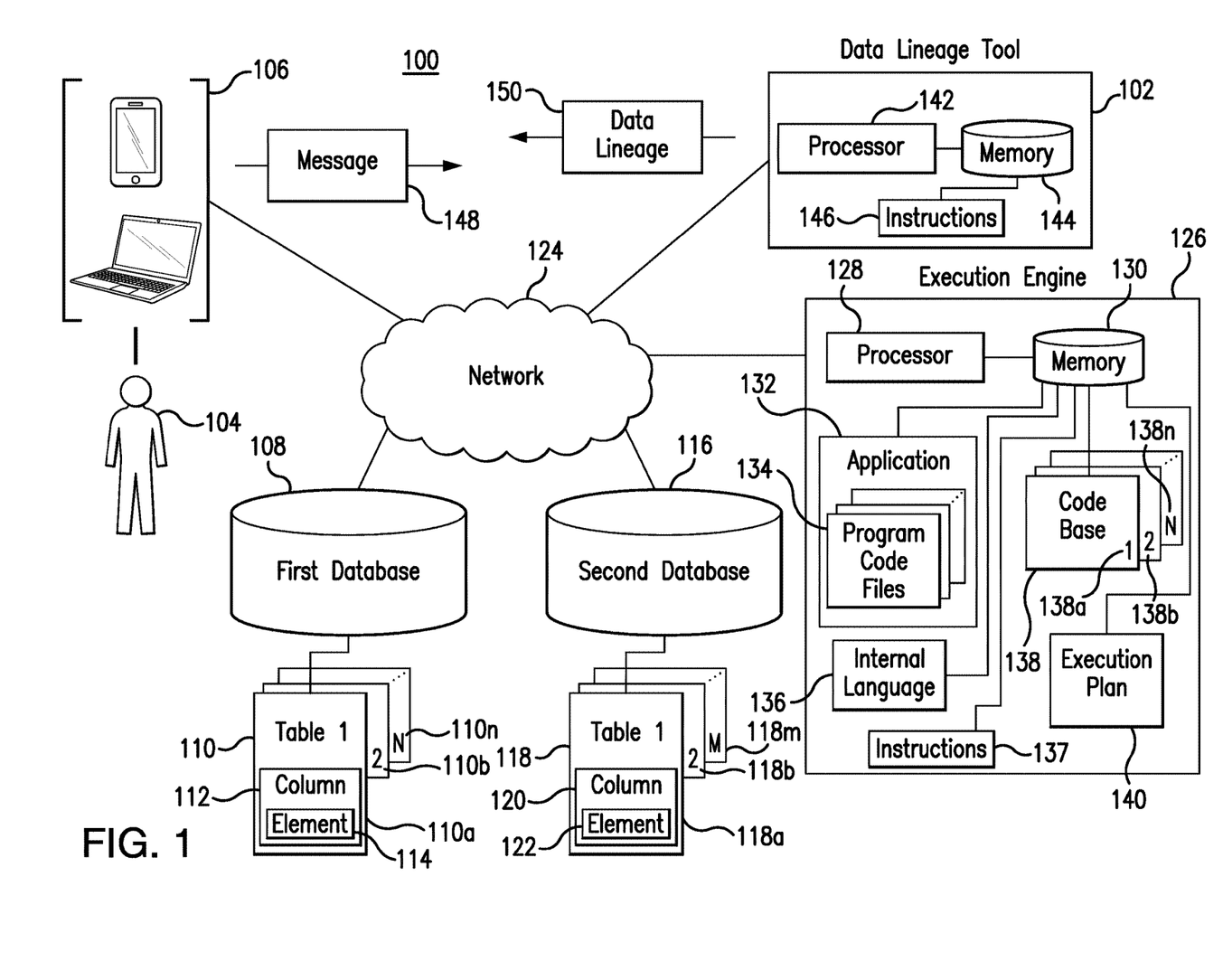
FIG. 1 illustrates an example data lineage system.
Figure 2A:
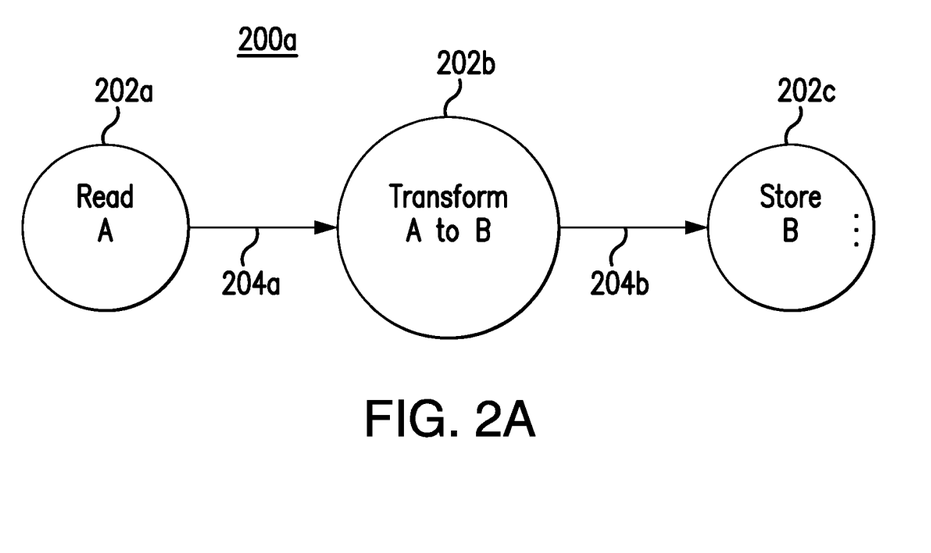
FIGS. 2A and 2B illustrate example execution plans generated by the execution engine of the system of FIG. 1.
Figure 2B:
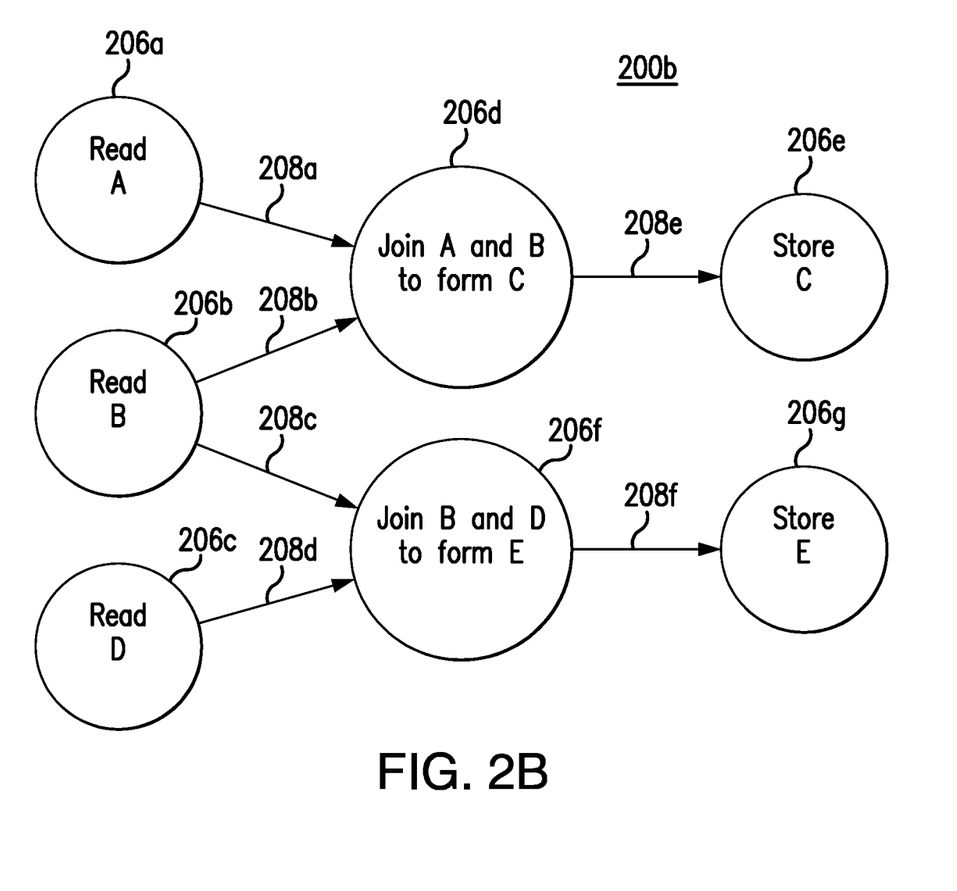
Figure 3:
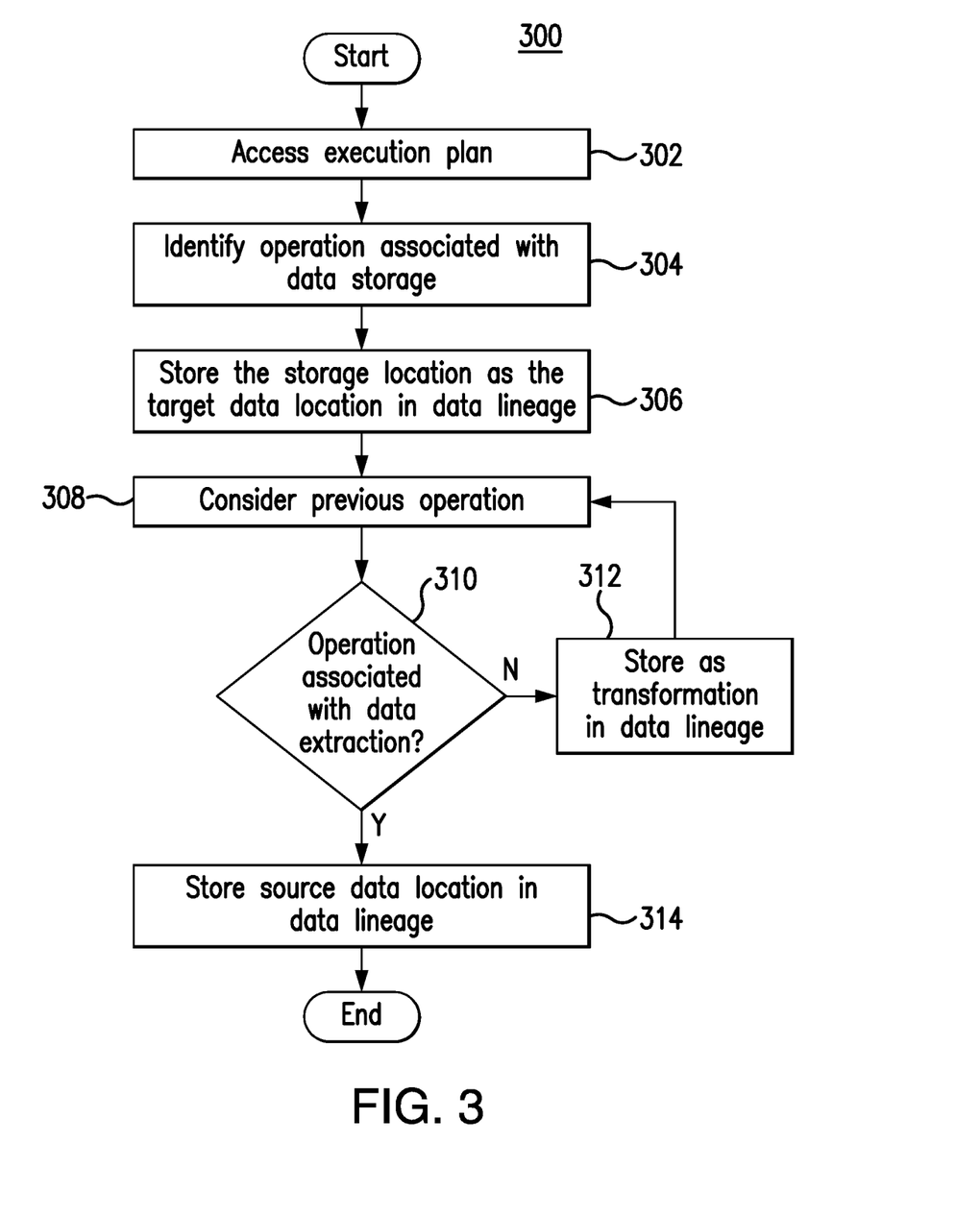
FIG. 3 presents a flowchart illustrating an example process by which the data lineage tool of the system of FIG. 1 generates data lineage using an execution plan generated by the execution engine of the system of FIG. 1.

Embodiments of the present disclosure and its advantages may be understood by referring to FIGS. 1 through 3 of the drawings, like numerals being used for like and corresponding parts of the various drawings.

I. System Overview

FIG. 1 illustrates an example data lineage system 100 that includes data lineage tool 102, user(s) 104, device(s) 106, first database 108, second database 116, network 124, and execution engine 126. Generally, data lineage tool 102 works in conjunction with execution engine 126 to obtain data lineage 150 for data generated by application 132, when the application is executed by execution engine 126. In response to receiving a request to execute application 132, execution engine translates the program code 134 of application 132 into execution plan 140. Execution plan 140 includes an ordered set of operations that, when performed by execution engine 126, constitute execution of application 132. Examples of execution plans 140 are presented in detail below, in the discussion of FIGS. 2A and 2B. Data lineage tool 102 is designed to access execution plan and to extract the data lineage for data generated by application 132 from execution plan 140. Because execution plan 140 is generated at runtime such that all of the variables within software code 134 have been instantiated and any data extraction code that is to be dynamically generated prior to its execution has been created, data lineage tool 102 may extract accurate and complete data lineage 150 from execution plan 140.

Devices 106 are used by users 104 located on network 124 to communicate with data lineage tool 102 and/or execution engine 126. For example, a user 104 may use device 106 to send messages 148 to execution engine 126 and/or data lineage tool 102. As an example, a user 104 may use device 106 to transmit a set of program code corresponding to an application to execution engine 126, as message 148, for execution of the application by the execution engine. As another example, a user 104 may use device 106 to submit a request 148 to execution engine 126, requesting that execution engine 126 execute an application 132. As another example, a user 104 may use device 106 to submit a request 148 to data lineage tool 102, requesting that date lineage tool 102 provide the data lineage associated with data (e.g., data that is stored in first database 108 and/or second database 116) that is generated by application 132. User 104 may also use device 106 to receive messages transmitted by execution engine 126 and/or data lineage tool 102. As an example, user 104 may use device 106 to receive data lineage 150 from data lineage tool 102.

Devices 106 include any appropriate device for communicating with components of system 100 over network 124. For example, devices 106 may be a telephone, a mobile phone, a computer, a laptop, a wireless or cellular telephone, a tablet, a server, and IoT device, and/or an automated assistant, among others. This disclosure contemplates devices 106 being any appropriate device for sending and receiving communications over network 124. Device 106 may also include a user interface, such as a display, a microphone, keypad, or other appropriate terminal equipment usable by user 104. In some embodiments, an application executed by a processor of device 106 may perform the functions described herein.

First database 108 and second database 116 are any data storage systems and/or data storage components that store information. First database 108 and second database 116 may store any types of information. For example, first database 108 and/or second database 116 may store integers, floating point numbers, date values, character expressions, and/or any other suitable types of information. First database 108 and second database 116 may store data in any suitable manner. For example, one or both of first database 108 and second database 116 may be a centralized database, a distributed database, a relational database, a non-relational database, a cloud database, and/or any other suitable type of database. In certain embodiments and as illustrated in FIG. 1, first database 108 and second database 116 each store data in a set of tables. For example, first database 108 stores data in tables 110a through 110n and second database 116 stores data in tables 118a through 118m. Each database 108/116 may include any number of tables 110/118. Each of first database 108 and second database 116 may be associated with a database management system (DBMS). For example, one or more of first database 108 and second database 116 may be associated with the Apache Hive database management system, and/or any other DBMS (for example, a relational database management system (RDMS)). While illustrated in FIG. 1 as including two databases, system 100 may include any number of one or more databases.

Network 124 facilitates communication between and amongst the various components of system 100. This disclosure contemplates network 124 being any suitable network operable to facilitate communication between such components. Network 124 may include any interconnecting system capable of transmitting audio, video, signals, data, messages, or any combination of the preceding. Network 124 may include all or a portion of a public switched telephone network (PSTN), a public or private data network, a local area network (LAN), a metropolitan area network (MAN), a wide area network (WAN), a local, regional, or global communication or computer network, such as the Internet, a wireline or wireless network, an enterprise intranet, or any other suitable communication link, including combinations thereof, operable to facilitate communication between the components.

a. Execution Engine

Execution engine 126 is configured to execute application 132. Application 132 is configured to perform any suitable function(s) associated with data stored in first database 108, second database 116, and/or any other suitable location. For example, application 132 may be a data processing application, a graphical analysis application, a machine learning application, and/or any other suitable application. In certain embodiments, application 132 is configured to extract one or more tables 110, columns 112, and/or data elements 114 from first database 108, perform one or more transformations (including, for example, an identity transformation) on the extracted data, and store the transformed data in second database 116 as one or more tables 118, columns 120 and/or data elements 122. In certain embodiments, execution engine 126 may store the transformed data in the same database in which the source data is located. In some embodiments, application 132 is configured to extract one or more columns 112 and/or data elements 114 from first database 108, perform one or more transformations (including, for example, an identity transformation) on the extracted data, and store the transformed data in a flat file.

Application 126 includes a set of code files 134. The set of code files 134 may include any number of files, written in any programming languages. For example, in certain embodiments, set of code files 134 includes files written in programming languages such as Java, Scala, Python, R, SQL, and/or any other suitable programming languages. The set of code files 134 may include source code files, data processing code files, script files, header files, configuration files, class files, and/or any other suitable file types. The code files included in set 134 define a set of operations that are to be performed during the execution of application 132. These operations may include any suitable data transformations and/or actions (e.g., storing data in a persistent storage location).

Execution engine 126 is configured to execute application 132 by (1) converting the set of code files 134 into an execution plan 140, and (2) executing the execution plan 140. Execution plan 140 includes the set of operations that are defined by set of code files 134. These operations are ordered within execution plan 140 such that execution plan 140 provides a logical flow for the operations. For example, in certain embodiments, execution plan 140 is a directed acyclic graph, where each node of the graph corresponds to an operation included the plan. In some embodiments, execution plan 140 is an optimized form of a directed acyclic graph (DAG). For example, execution plan 140 may correspond to a DAG that has been optimized to run on a collection of processors (e.g., optimized for parallel processing). Examples of DAGs are presented below, in the discussion of FIGS. 2A and 2B.

Execution engine 126 generates execution plan 140 from set of code files 134, by identifying operations within the set of code files 124, and translating the code statements corresponding to these operations into an internal language 136 that is used by execution engine 126. Internal language 136 may correspond to an existing programming language, or a new programming language for use by execution engine 126. To perform the translation from code statements that are included in set of code files 134 into internal language 136, in certain embodiments, execution engine 126 relies on code bases 128a through 128n. Each code base of code bases 128a through 128n is associated with a programming language and is used by execution engine 126 to translate operations written in that programming language into operations written in internal language 136. For example, code base 138a may be associated with the Java programming language, and code base 138b may be associated with the Scala programming language. Execution engine may include any number of code bases 138. For example, execution engine may include a code base 138 for each programming language in which program code files 134 may be written.

In certain embodiments, values of one or more variables/parameters that are used in application 132 are not assigned until runtime. In such embodiments, converting the set of code files 134 into execution plan 140 (in response to receiving a request to execute application 132) includes assigning specific values to the one or more variables/parameters, such that execution plan 140 includes the assigned values. In some embodiments, application 132 generates and/or uses data processing code (e.g., SQL code) that is dynamically generated before its execution during runtime. In such embodiments, converting the set of code files 134 into execution plan 140 (in response to receiving a request to execute application 132) includes generating the data processing code and incorporating the operations associated with the data processing code into execution plan 140.

Execution engine 126 may be any suitable engine capable of performing the above-described functions. For example, in certain embodiments, execution engine 126 is an existing execution engine, such as the Apache Spark Engine. Apache Spark is an open-source execution engine that is commonly used to execute applications in big-data environments. Spark may be used to execute applications written in any of Java, Scala, Python, R, and/or SQL. In embodiments in which execution engine 126 is the Apache Spark execution engine, execution plan 140 may correspond to the Spark logical execution plan or the Spark physical execution plan.

As illustrated in FIG. 1, execution engine 126 includes processor 128 and memory 130. This disclosure contemplates processor 128 and memory 130 being configured to perform any of the functions of execution engine 126 described herein. For example, processor 128 may execute instructions 137 stored in memory 130 to perform any of the functions described above. In particular, processor 128 may (1) receive a request 148 to execute application 132; (2) use code base 138 and internal language 136, stored in memory 130, to convert the set of code files 134, corresponding to application 132, into execution plan 140; and (3) execute execution plan 140. While illustrated in FIG. 1 as including a single processor 128 and a single memory 130, execution engine 126 may include any number of processors 128 and memories 130. For example, in certain embodiments, execution engine 126 includes a primary processor 128 (and associated primary memory 130), and a set of secondary processors 128 (and associated secondary memories 130). Primary processor 128 may use code base 138 to convert set of code files 134 into execution plan 140. Primary processor 128 may then use execution plan 140 to schedule work across the set of secondary processors 128. For example, each secondary processor 128 may be assigned one or more tasks to perform from execution plan 140. In this manner, execution engine 126 may efficiently execute application 132, by performing portions of application 132 in parallel.

Processor 128 is any electronic circuitry, including, but not limited to central processing unit(s) (CPUs), graphics processing unit(s) (GPUs), microprocessors, application specific integrated circuits (ASIC), application specific instruction set processor (ASIP), and/or state machines, that communicatively couples to memory 130 and controls the operation of execution engine 126. Processor 128 may be 8-bit, 16-bit, 32-bit, 64-bit or of any other suitable architecture. Processor 128 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. Processor 128 may include other hardware and software that operates to control and process information. Processor 128 executes software stored on memory to perform any of the functions described herein. Processor 128 controls the operation and administration of execution engine 126 by processing information received from network 124, device(s) 106, first database 108, second database 116, and/or memory 130. Processor 128 may be a programmable logic device, a microcontroller, a microprocessor, any suitable processing device, or any suitable combination of the preceding. Processor 128 is not limited to a single processing device and may encompass multiple processing devices. For example, as described above, in certain embodiments, processor 128 corresponds to a system of processors that includes a primary processor and a set of secondary processors.

Memory 130 may store, either permanently or temporarily, data, operational software, or other information for processor 128. Memory 130 may include any one or a combination of volatile or non-volatile local or remote devices suitable for storing information. For example, memory 130 may include random access memory (RAM), read only memory (ROM), magnetic storage devices, optical storage devices, or any other suitable information storage device or a combination of these devices. The software represents any suitable set of instructions, logic, or code embodied in a computer-readable storage medium. For example, the software may be embodied in memory 130, a disk, a CD, or a flash drive. In particular embodiments, the software may include an application executable by processor 128 to perform one or more of the functions described herein.

b. Data Lineage Tool

Data lineage tool 102 is configured to determine the data lineage for data elements stored in first database 108 and/or second database 116, based on the transformations applied to the data by application 132. As seen in FIG. 1, data lineage tool 102 includes a processor 142 and a memory 144. This disclosure contemplates processor 142 and memory 144 being configured to perform any of the functions of data lineage tool 102 described herein. For example, processor 142 may execute instructions 146 stored in memory 144 to perform any of the functions described herein. In certain embodiments, data lineage tool 102 may be associated with instructions 137 stored in memory 130 of execution engine 126. For example, in certain embodiments, processor 142 and memory 144 of data lineage tool 102 may correspond to processor 128 and memory 130 of execution engine 116.

Generally, data lineage tool 102 is configured to determine data lineage 150 for a given data column 120 and/or data element 122 by: (1) accessing execution plan 140; (2) identifying an action in execution plan 140 associated with storing data table 118, data column 120, and/or data element 122 in a permanent storage location (e.g., second database 116); (3) traversing each operation in execution plan 140 from the action associated with storing the data in the permanent storage location, to one or more operations associated with extracting data from a permanent storage location (e.g., extracting data table 110, data column 112, and/or data element 114 from first database 108), and generating a portion of data lineage 150 from each such operation. The manner by which data lineage tool 120 generates data lineage 150 for a given data table 118, data column 120, and/or data element 122 is described in further detail below, in the discussion of FIGS. 2A and 2B.

Because execution plan 140 is generated by execution engine 126 by converting program code files 134, written in one or more programming languages, into an ordered set of operations written in internal language 136, data lineage tool 102 is able to generate data lineage 150 without any knowledge of (1) the programming language(s) that program code files 134 were written in, and (2) the software architecture of application 132. Additionally, because execution plan 140 is generated by execution engine 126 during runtime of application 132, data lineage tool 102 is able to generate complete data lineage for data generated by application 132, since all of the variables included in program code 134 have been instantiated and any code dynamically generated by application 132 has been created when execution plan 140 is generated.

Processor 142 is any electronic circuitry, including, but not limited to central processing unit(s) (CPUs), graphics processing unit(s) (GPUs), microprocessors, application specific integrated circuits (ASIC), application specific instruction set processor (ASIP), and/or state machines, that communicatively couples to memory 144 and controls the operation of data lineage tool 102. Processor 142 may be 8-bit, 16-bit, 32-bit, 64-bit or of any other suitable architecture. Processor 142 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. Processor 142 may include other hardware and software that operates to control and process information. Processor 142 executes software stored on memory 144 to perform any of the functions described herein. Processor 142 controls the operation and administration of data lineage tool 102 by processing information received from network 124, device(s) 106, first database 108, second database 116, execution engine 126, and/or memory 130. Processor 142 may be a programmable logic device, a microcontroller, a microprocessor, any suitable processing device, or any suitable combination of the preceding. Processor 142 is not limited to a single processing device and may encompass multiple processing devices. In certain embodiments, processor 142 may correspond to the same processor as processor 128.

Memory 144 may store, either permanently or temporarily, data, operational software, or other information for processor 142. Memory 144 may include any one or a combination of volatile or non-volatile local or remote devices suitable for storing information. For example, memory 144 may include random access memory (RAM), read only memory (ROM), magnetic storage devices, optical storage devices, or any other suitable information storage device or a combination of these devices. The software represents any suitable set of instructions, logic, or code embodied in a computer-readable storage medium. For example, the software may be embodied in memory 144, a disk, a CD, or a flash drive. In particular embodiments, the software may include an application executable by processor 142 to perform one or more of the functions described herein. In certain embodiments, memory 144 may correspond to the same memory as memory 130.

Modifications, additions, or omissions may be made to the systems described herein without departing from the scope of the invention. For example, system 100 may include any number of users 104, devices 106, first databases 108, second databases 116, networks 124, and execution engines 126. The components may be integrated or separated. Moreover, the operations may be performed by more, fewer, or other components. Additionally, the operations may be performed using any suitable logic comprising software, hardware, and/or other logic.

II. Execution Plans

FIGS. 2A and 2B present example directed acyclic graphs 200*a* and 200*b*, respectively, from which data lineage may be extracted. In the discussion that follows, reference will be made to components of system 100, as illustrated in FIG. 1. Graphs 200*a* and 200*b* may be generated by execution engine 126 and incorporated into execution plan 140, for execution by execution engine 126. As described in detail below, data lineage tool 102 may access execution plan 140, to extract data lineage 150 from graphs 200*a* and/or 200*b*.

FIG. 2A illustrates a graph 200*a* that corresponds to a transformation of data A into data B. Data A may be any suitable data. For example, data A may correspond to a data element, a data column/row, a data table, or any other suitable form of data. Similarly, data B may correspond to a data element, a data column/row, a data table, or any other suitable form of data. The transformation performed on data A to generate data B may be any suitable transformation. For example, data A may be truncated, rounded, multiplied by a constant factor, and/or transformed in any other suitable way to generate data B. In some embodiments, an identity transformation may be performed on data A, such that graph 200*a* corresponds to a copying and/or moving data A from one storage location to another storage location.

As illustrated in FIG. 2A, graph 200*a* includes a set of nodes 202*a* through 202*c* and a set of edges 204*a* through 204*b*. Each node 202*a* through 202*c* corresponds to an operation that is performed on one or more pieces of data, and each edge 204*a* through 204*b* indicates the flow of the operations. Graph 200*a* is directed because each edge 204*a* through 204*b* is associated with a direction. Graph 200*a* is acyclic because each edge 204*a* through 204*b* directs from an operation 202*a/b* occurring earlier in the sequence of operations 202*a* through 202*c* to an operation 202*b/c* occurring later in the sequence. As illustrated in FIG. 2A, graph 200*a* includes a set of three operations 202*a* through 202*c*. Operation 202*a* corresponds to reading data A from a storage location, operation 202*b* corresponds to apply a transformation on data A to generate data B, and operation 202*c* corresponds to storing data B in a persistent storage location.

Graph 200*a* may be represented in execution plan 140 in any suitable manner that indicates the ordered flow of operations from operation 202*a* to operation 202*c*. For example, execution plan 140 may include an ordered sequence of operations 202*a* through 202*c*. Operations 202*a* through 202*c* of graph 200*a* may correspond to the only operations included in execution plan 140 or may correspond to a subset of the operations included in execution plan 140. For example, execution plan 140 may include further operations to be performed on data A and/or data B, and/or operations to be performed on additional data.

Data lineage tool 102 may access graph 200*a* in execution plan 140 to obtain data lineage 140 for data B. Specifically, data lineage tool 102 may determine that operation 202*c* corresponds to storing data B in a persistent storage location. In response to such determination, data lineage tool 102 traverses the graph 200*a* in a direction that is opposite to the logical flow of operations 202*a* through 202*c*, starting from operation 202*c* and tracing backwards until data storage tool 102 identifies an operation associated with extracting data from a persistent storage location (illustrated in FIG. 2A as operation 202*a*). From each operation 202*a* through 202*c*, data lineage tool 102 generates a portion of the data lineage 150 for data B. For example, from operation 202*c* data lineage tool 102 extracts the target location for data B, from operation 202*b* data lineage tool 102 extracts the transformation that was performed to generate data B, and from operation 202*a* data lineage tool 102 extracts the source location of the data (data A) that was used to generate data B.

In certain embodiments, in addition to generating data lineage 150 that includes the source data locations, any transformations performed on the data, and the target data location, data lineage tool 102 may generate data lineage 150 that includes any temporary storage locations for the data. As an example, operation 202*a* may correspond to reading data A from a source data location and storing data A into a first temporary location, operation 202*b* may correspond to transforming data A (stored in the first temporary location) into data B and storing data B in a second temporary location, and operation 202*c* may correspond to taking data B (stored in the second temporary location) and storing it in the target data location. Accordingly, data lineage 150 may include the source data location, the first temporary location, the transformation, the second temporary location, and the target data location.

FIG. 2B presents another example of a directed acyclic graph 200*b* that may be included in execution plan 140. Graph 200*b* includes two transformations—a first transformation 206*d* in which data A and data B are joined to create data C, and a second transformation 206*f* in which data B and data D are joined to create data E. As illustrated in FIG. 2B, graph 200*b* includes a set of nodes 206*a* through 206*g* and a set of edges 208*a* through 208*f*. Each node 206*a* through 206*g* corresponds to an operation that is performed on one or more pieces of data, and each edge 208*a* through 208*f* indicates the flow of the operations.

Data lineage tool 102 may access graph 200*b* in execution plan 140 to obtain data lineage 140 for data C and/or data E. Specifically, data lineage tool 102 may determine that operation 206*e* corresponds to storing data C in a persistent storage location. In response to such determination, data lineage tool 102 traverses graph 200*b* in a direction that is opposite to the logical flow of the operations within the graph. Data lineage tool 102 starts at operation 206*e*, obtaining the target data location for data C from operation 206*e*. Next, data lineage tool 102 considers operation 206*d* and obtains the transformation performed to generate data C. As illustrated in FIG. 2B, data lineage tool 102 may trace backwards from operation 206*d* along two different branches—a first branch towards operation 206*a* and a second branch towards operation 206*b*. Data lineage tool 102 considers each of these two branches (e.g., in turn or in parallel), obtaining source data location for data A from operation 206*a* and source data location for data B from operation 206*b*. In this manner, data lineage tool 102 may generate data lineage 150 for data C that indicates that data C (stored at a first target data location), was generated from both data A (stored at a first source data location) and data B (stored at a second source data location) by performing a transformation involving joining data A and data B to form data C. In a similar manner, data lineage tool 102 may generate data lineage 150 for data E that indicates that data E (stored at a second target data location), was generated from both data B (stored at the second source data location) and data D (stored at a third source data location) by performing a transformation involving joining data B and data D to form data E.

III. Method for Generating Data Lineage

FIG. 3 presents a flowchart (described in conjunction with elements of FIG. 1) illustrating an example method 300 by which data lineage tool 102 accesses and uses execution plan 140 to generate data lineage 150.

In step 302 data lineage tool 102 accesses an execution plan 140 generated by execution engine 126. Data lineage tool 102 may be configured to access execution plan 140 in any suitable manner. For example, in certain embodiments, execution engine 126 may be instructed to invoke data lineage tool 102 when executing application 132. As an example, execution engine 126 may be instructed to invoke data lineage tool 102 by supplying execution engine 126 with one or more configuration parameters. For instance, such configuration parameters may be inserted into instructions 137, stored in memory 130, and/or provided to execution engine 126 in message 148. As a specific example, message 148 may correspond to a command line request to use execution engine 126 to execute application 132. User 104 may specify one or more configuration parameters in the command line request in order to instruct execution engine 126 to invoke data lineage tool 102 while executing application 132. In certain embodiments in which execution engine 126 is the Apache Spark execution engine, data lineage tool 102 may access an execution plan 140 associated with storing a given set of data in a persistent storage location, by calling the explain( ) operator on the set of data.

In step 304 data lineage tool 102 identifies an operation in execution plan 140 that is associated with storing a target data element (e.g., data element 122, data column 120, and/or data table 118) in persistent storage (e.g., second database 116). In step 306 data lineage tool 102 stores that persistent storage location in the data lineage 150 for the target data element, as the target data location. In step 308 data lineage tool 102 considers the previous operation in execution plan 140 (e.g., data lineage tool 102 traverses the DAG presented in execution plan 140 in a direction that is opposite the logical flow of operations in the DAG). In step 310 data lineage tool 102 determines whether the previous operation is associated with extracting a source data element (e.g., data element 114, data column 112, and/or data table 110) from a persistent storage location (e.g., first database 108). If, in step 310 data lineage tool 102 determines that the previous operation is associated with extracting a source data element from a persistent storage location, in step 314 data lineage tool 102 stores that persistent storage location in the data lineage 150 for the target element, as a source data location.

If, in step 310 data lineage tool 102 determines that the previous operation is not associated with extracting a source data element from a persistent storage location, in step 312 data lineage tool 102 stores the operation as a transformation in the data lineage 150 for the target element (e.g., a transformation performed to generate the target data element). Method 300 then returns to step 308.

In certain embodiments, at step 308, data lineage tool 102 may identify more than one previous operation. This may occur when the DAG presented in execution plan 140 includes one or more branches that join at the operation under consideration (e.g., when the operation under consideration involves combining data elements). For example, consider DAG 200*b*, presented in FIG. 2B. As illustrated in FIG. 2B, operation 206*d*, which involves joining data element A and data element B to form data element C, is associated with two previous operations—operation 206*a*, associated with reading data element A from persistent storage, and operation 206*b*, associated with reading data element B from persistent storage. In such embodiments, data lineage tool 102 may perform steps 308 through 314 for each branch in execution plan 140.

Modifications, additions, or omissions may be made to method 300 depicted in FIG. 3. Method 300 may include more, fewer, or other steps. For example, steps may be performed in parallel or in any suitable order. While discussed as data lineage tool 102 (or components thereof) performing the steps, any suitable component of system 100, such as device(s) 106 and/or execution engine 126 for example, may perform one or more steps of the method.

Although the present disclosure includes several embodiments, a myriad of changes, variations, alterations, transformations, and modifications may be suggested to one skilled in the art, and it is intended that the present disclosure encompass such changes, variations, alterations, transformations, and modifications as falling within the scope of the appended claims.

What is claimed is:

1. A system comprising:
a first database configured to store a set of data elements, the set of data elements comprising a first data element;
a second database;
an execution engine comprising one or more hardware processors, the execution engine configured to:
receive a set of code corresponding to an application, the application configured, when executed by the execution engine, to:
generate, based at least in part on the first data element, a second data element; and
store the second data element in the second database; and
execute the application, wherein executing the application comprises:
converting the set of code into an execution plan, the execution plan comprising a set of operations comprising:
a first operation comprising obtaining the first data element from the first database;
a second operation comprising applying a transformation to the first data element to generate the second data element; and
a third operation comprising storing the second data element in the second database; and
executing the execution plan; and
a hardware processor communicatively coupled to the execution engine, the hardware processor configured to:
access the execution plan;
determine that the third operation of the execution plan comprises storing the second data element in the second database; and
in response to determining that the third operation comprises storing the second data element in the second database, generate a data lineage for the second data element by extracting, from each operation from the third operation of the execution plan to the first operation of the execution plan, a portion of the data lineage for the second data element, wherein:
the portion of the data lineage extracted from the third operation comprises a location of the second data element in the second database;
the portion of the data lineage extracted from the second operation comprises the transformation; and
the portion of the data lineage extracted from the first operation comprises a location of the first data element in the first database.

2. The system of claim 1, wherein:
the execution plan comprises a directed acyclic graph comprising a set of nodes; and
each operation of the set of operations corresponds to a node of the set of nodes.

3. The system of claim 1, wherein the set of code comprises:
a first set of code written in a first programming language; and
a second set of code written in a second programming language, the second programming language different from the first programming language.

4. The system of claim 3, wherein the set of operations is agnostic to the first programming language and the second programming language.

5. The system of claim 1, wherein:
the set of code comprises a variable;
the application, when executed, is configured to dynamically assign a value to the variable; and
converting the set of code into the execution plan comprises dynamically assigning the value to the variable.

6. The system of claim 1, wherein:
the set of code comprises instructions to dynamically generate additional code; and
converting the set of code into the execution plan comprises:
dynamically generating, based on the instructions, the additional code; and
converting the additional code into one or more operations of the set of operations of the execution plan.

7. The system of claim 1, wherein:
the first data element is stored in the first database in a source column;
storing the second data element in the second database comprises storing the second data element in a target column in the second database; and
the data lineage indicates that the target column was generated from the source column using the transformation.

8. A method comprising:
accessing an execution plan, wherein:
the execution plan comprises a set of operations comprising:
a first operation comprising obtaining a first data element from a first database;
a second operation comprising applying a transformation to the first data element to generate a second data element; and
a third operation comprising storing the second data element in a second database; and
the execution plan was generated by an execution engine based on a set of code corresponding to an application, the application configured, when executed by the execution engine, to:
generate, based at least in part on the first data element, the second data element; and
store the second data element in the second database; and
determining that the third operation of the execution plan comprises storing the second data element in the second database; and
in response to determining that the third operation comprises storing the second data element in the second database, generating a data lineage for the second data element by extracting, from each operation from the third operation of the execution plan to the first operation of the execution plan, a portion of the data lineage for the second data element, wherein:
the portion of the data lineage extracted from the third operation comprises a location of the second data element in the second database;
the portion of the data lineage extracted from the second operation comprises the transformation; and
the portion of the data lineage extracted from the first operation comprises a location of the first data element in the first database.

9. The method of claim 8, wherein:
the execution plan comprises a directed acyclic graph comprising a set of nodes; and
each operation of the set of operations corresponds to a node of the set of nodes.

10. The method of claim 8, wherein the set of code comprises:
a first set of code written in a first programming language; and
a second set of code written in a second programming language, the second programming language different from the first programming language.

11. The method of claim 10, wherein the set of operations is agnostic to the first programming language and the second programming language.

12. The method of claim 8, wherein:
the set of code comprises a variable;
the application, when executed by the execution engine, is configured to dynamically assign a value to the variable; and
the execution engine generated the execution plan in part by dynamically assigning the value to the variable.

13. The method of claim 8 wherein:
the set of code comprises instructions to dynamically generate additional code; and
the executing engine generated the execution plan in part by dynamically generating, based on the instructions, the additional code.

14. The method of claim 8, wherein:
the first data element is stored in the first database in a source column;
storing the second data element in the second database comprises storing the second data element in a target column in the second database; and
the data lineage indicates that the target column was generated from the source column using the transformation.

15. An apparatus comprising:
a memory configured to store an execution plan, wherein:
the execution plan comprises a set of operations comprising:
a first operation comprising obtaining a first data element from a first database;

a second operation comprising applying a transformation to the first data element to generate a second data element; and
a third operation comprising storing the second data element in a second database; and
the execution plan was generated by an execution engine based on a set of code corresponding to an application, the application configured, when executed by the execution engine, to:
generate, based at least in part on the first data element, the second data element; and
store the second data element in the second database; and
a hardware processor communicatively coupled to the memory, the hardware processor configured to:
access the execution plan;
determine that the third operation of the execution plan comprises storing the second data element in the second database; and
in response to determining that the third operation comprises storing the second data element in the second database, generate a data lineage for the second data element by extracting, from each operation from the third operation of the execution plan to the first operation of the execution plan, a portion of the data lineage for the second data element, wherein:
the portion of the data lineage extracted from the third operation comprises a location of the second data element in the second database;
the portion of the data lineage extracted from the second operation comprises the transformation; and
the portion of the data lineage extracted from the first operation comprises a location of the first data element in the first database.

16. The apparatus of claim 15, wherein:
the execution plan comprises a directed acyclic graph comprising a set of nodes; and
each operation of the set of operations corresponds to a node of the set of nodes.

17. The apparatus of claim 15, wherein the set of code comprises:
a first set of code written in a first programming language; and
a second set of code written in a second programming language, the second programming language different from the first programming language.

18. The apparatus of claim 17, wherein the set of operations is agnostic to the first programming language and the second programming language.

19. The apparatus of claim 15, wherein:
the set of code comprises a variable;
the application, when executed by the execution engine, is configured to dynamically assign a value to the variable; and
the execution engine generated the execution plan in part by dynamically assigning the value to the variable.

20. The apparatus of claim 15 wherein:
the set of code comprises instructions to dynamically generate additional code; and
the executing engine generated the execution plan in part by dynamically generating, based on the instructions, the additional code.

* * * * *